United States Patent
Dungan

(10) Patent No.: US 7,940,315 B2
(45) Date of Patent: May 10, 2011

(54) METHOD AND APPARATUS FOR IDENTIFICATION AND CORRECTION OF ABERRANT PIXELS IN AN IMAGE SENSOR

(75) Inventor: Thomas Edward Dungan, Fort Collins, CO (US)

(73) Assignee: Aptina Imaging Corporation, Grand Cayman (KY)

( * ) Notice: Subject to any disclaimer, the term of this patent is extended or adjusted under 35 U.S.C. 154(b) by 653 days.

(21) Appl. No.: 11/970,006

(22) Filed: Jan. 7, 2008

(65) Prior Publication Data

US 2009/0174801 A1    Jul. 9, 2009

(51) Int. Cl.
*H04N 9/64* (2006.01)

(52) U.S. Cl. ...... 348/246; 348/247; 348/308; 250/208.1

(58) Field of Classification Search ........... 348/246, 348/247, 294–310; 250/208.1
See application file for complete search history.

(56) References Cited

U.S. PATENT DOCUMENTS

| | | | |
|---|---|---|---|
| 6,140,630 A | 10/2000 | Rhodes | |
| 6,396,539 B1 | 5/2002 | Heller et al. | |
| 6,515,702 B1 | 2/2003 | Yadid-Pecht et al. | |
| 6,710,804 B1 * | 3/2004 | Guidash | 348/302 |
| 6,737,625 B2 | 5/2004 | Baharav et al. | |
| 6,806,902 B1 | 10/2004 | Donovan | |
| 6,965,395 B1 | 11/2005 | Neter | |
| 6,972,794 B1 * | 12/2005 | Wang et al. | 348/302 |
| 7,009,644 B1 | 3/2006 | Sanchez et al. | |
| 7,034,873 B2 | 4/2006 | Mendis et al. | |
| 7,034,874 B1 | 4/2006 | Reinhart et al. | |
| 7,064,406 B2 | 6/2006 | Mouli | |
| 7,064,768 B1 | 6/2006 | Bao | |
| 7,202,894 B2 | 4/2007 | Kaplinsky et al. | |
| 2003/0030738 A1 | 2/2003 | Clynes et al. | |
| 2007/0279502 A1 * | 12/2007 | Inoue | 348/272 |
| 2008/0100728 A1 * | 5/2008 | Nagata | 348/247 |
| 2008/0259188 A1 * | 10/2008 | Kobayashi et al. | 348/247 |
| 2010/0045834 A1 * | 2/2010 | Iwabuchi et al. | 348/300 |

FOREIGN PATENT DOCUMENTS

JP     2000200896      7/2000

OTHER PUBLICATIONS

Bayer Dark Field Dead and Defective Pixel Detection, 2006 Jova Solutions, Inc.

* cited by examiner

*Primary Examiner* — Sinh Tran
*Assistant Examiner* — Anthony J Daniels
(74) *Attorney, Agent, or Firm* — RatnerPrestia

(57) ABSTRACT

An apparatus and method for identifying aberrant pixels in an image sensor. The apparatus includes a light sensitive element configured to detect a first signal value representing a first level of an incident light and a light sensitive region separate from the light sensitive element configured to detect a second signal value representing a second level of the incident light. Comparing circuitry is configured to compare the first signal value and the second signal value and to output a signal indicating the pixel is an aberrant pixel if the first and second signal values differ by more than a maximum threshold value or less than a minimum threshold value in a threshold value range.

17 Claims, 10 Drawing Sheets

METHOD AND APPARATUS FOR IDENTIFICATION AND CORRECTION OF ABERRANT PIXELS IN AN IMAGE SENSOR

BACKGROUND OF THE INVENTION

Imagers, including complimentary metal oxide semiconductor (CMOS) imagers and charge-coupled devices (CCD), may be used in digital imaging applications to capture scenes. An imager may include an array of pixels. Each pixel in the array may include at least a photosensitive element for outputting a signal having a magnitude proportional to the intensity of incident light contacting the photosensitive element. When exposed to incident light to capture a scene, each pixel in the array outputs a signal having a magnitude corresponding to an intensity of light at one point in the scene. The signals output from each photosensitive element may be processed to form an image representing the captured scene.

Ideally, all pixels in an imager will produce a signal having the same magnitude when exposed to incident light having the same intensity. In reality, however, under uniform illumination, some pixels in each manufactured imager may produce signals having larger or smaller magnitudes than the average pixel in the imager. Pixels producing signals having larger magnitudes than the average pixel are typically referred to as hot or white pixels and signals having smaller magnitudes than the average pixel are typically referred to as cold or dark pixels. Because the intensity of light at a point in the formed image corresponds to the magnitude of the signal output by the corresponding pixel, hot pixels may appear as white spots in the formed image and cold pixels may appear as dark spots in the formed image. Accordingly, while almost all real imagers have at least a few hot and cold (collectively referred to as "aberrant") pixels, the effects of these aberrant pixels are not ideal.

Aberrant pixels may exist in real imagers for several reasons. One reason may be physical defects in the pixel. Examples of physical defects may include point defects in the material used to fabricate the pixel array, short or open circuits in the photosensitive element, defects in the readout circuitry and design defects in the reset circuitry. An aberrant pixel may also occur due to non-uniform additional charge—not generated from incident light—exists in the pixel. One such charge may be leakage current. Leakage current refers to electric charges that leak into the sensor wells. Another such charge may be dark current. Dark current refers to a certain level of background electron collection that exists in all pixels due to thermal generation of electron hole pairs. Because the readout circuitry may not distinguish between sources of charge in the photosensitive element, non-uniform leakage current and dark current may be added to or subtracted from the magnitude of the signal output from the pixel, thus making the pixel appear brighter or darker in the produced image than that point actually appeared in the scene.

Because it would be prohibitively expensive and time consuming to require that all imagers produced on a production line have no aberrant pixels, it may be acceptable to produce imagers that contain some aberrant pixels. To counteract the effect of the aberrant pixels in these imagers, the aberrant pixels may be identified and corrected for during image processing.

Common methods of detecting aberrant pixels include comparing the output signal of each pixel with the output signals of neighboring pixels. Different algorithms may use a different number of neighboring pixels or different neighboring pixel locations for this purpose. If the difference falls outside a threshold range, the pixel may be identified as an aberrant pixel and the pixel may be corrected for during image processing. If the difference falls within the threshold range, the value may be output without correction.

One concern in designing aberrant pixel correction algorithms may be to provide a balance between accurately identifying as many truly aberrant pixels as possible and falsely identifying too many truly good pixels as aberrant pixels. The common aberrant pixel algorithms described above may identify too many good pixels as aberrant pixels for at least two reasons. First, images with sharp contrasts may cause common correction algorithms to falsely identify many good pixels in high-contrast regions of the image as aberrant pixels. This is because neighboring pixels in high contrast images may drastically differ in intensity, causing the difference between levels of neighboring pixels to be large. Second, with respect to color image sensors, color filters are typically arrayed over the pixels such that the immediate neighbors of any given pixel are sensitive to different wavelengths of incident light. This may cause the common pixel correction algorithm to identify too many good pixels as aberrant pixels or, at the very least, complicate pixel correction algorithms that may account for the different wavelengths.

For at least these reasons, common pixel correction methods and apparatuses may fail to identify aberrant pixels which should be corrected or they may average out real signal variations through overcorrection, resulting in loss of image sharpness.

DETAILED DESCRIPTION OF THE INVENTION

Figure 1:
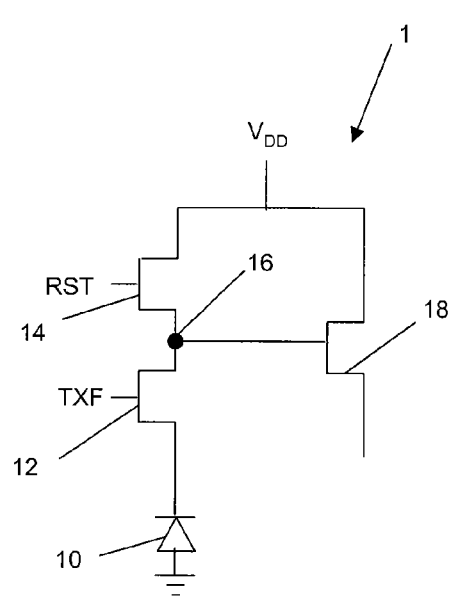
FIG. 1 is a circuit diagram of a pixel according to an example embodiment of the present invention.

FIG. 1 shows an example four transistor ("4T") CMOS pixel. As shown, the example 4T pixel may include three transistors 12, 14 and 18, as well as a select transistor (not shown), a photodiode 10 and floating diffusion 16. The three transistors may include transfer gate 12, reset transistor 14 and source follower transistor 18. In this example 4T pixel, a pinned photodiode is used as photodiode 10. Photodiode 10 may, however, be any photosensitive element, which may include photogates, photoconductors, p-n junction photodiodes, Schottky photodiodes or other suitable photoconversion devices.

In operation, to capture an image, floating diffusion 16 may first be reset by applying transfer signal TXF to transfer gate 12 and applying reset signal RST to reset transistor 14. This may open reset transistor 14 and transfer gate 12 to pull electrons out of photodiode 10. When transfer gate 112 is then closed, a positive charge is captured on the reverse-biased photodiode 10. The photodiode then begins to collect electrons generated by the absorption of incident light during the integration period. Note that free electrons produced by mechanisms other than optical absorption (such as thermally-generated dark current) may also be collected during the integration period.

The typical read sequence consists of opening and closing the reset transistor while the transfer gate is closed to pull the floating diffusion 16 back to its high (reset level), reading the reset signal level through the source follower and output column, and storing that reset signal temporarily on a capacitor. Next, the transfer gate 12 is opened to transfer the electrons collected during the integration period onto the floating diffusion to produce the "image" signal level. The image level is then read out through the source follower and output column onto a second capacitor. Analog circuitry is used to take the difference between the reset and image signals, producing an output signal intended to be proportional to the incident light level during the integration period, with the pixel-to-pixel or temporal noise in the reset level subtracted out. The storing of the reset level and subtraction of the reset level from the image level is commonly referred to as correlated double sampling (CDS).

Figure 2:
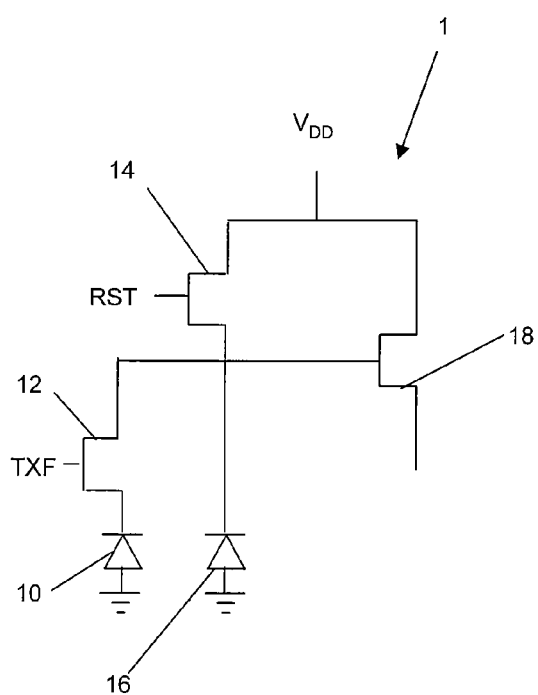
FIG. 2 is a circuit diagram of the example pixel shown in FIG. 1, wherein the floating diffusion is depicted as a separate photodiode.

While floating diffusions are commonly used to buffer the accumulated photocharges from a photodiode, example floating diffusion 16 may also be used for purposes of identifying aberrant pixels. For illustration purposes only, the pixel circuit of FIG. 1 has been reproduced in FIG. 2 to show floating diffusion 16 as a separate photodiode from main photodiode 10. This is to show that, while not known to be used for this purpose, floating diffusion 16 may be used as a pseudo-photodiode. As shown, example floating diffusion 16 provides an additional PN junction which may collect electrons created by incident light. Thus, instead of using neighboring pixels as references for identifying aberrant pixels, floating diffusion 16 may be used as a reference for identifying aberrant pixels. Because floating diffusion 16 may be part of the pixel structure, it may be located closer to main photodiode 10 than the surrounding pixels and may be located under the same color filter as main photodiode 10. Accordingly, the problems presented by high contrast images as well as the problems presented by neighboring photodiodes being located under different color filters are mitigated when the example floating diffusion 16 is used as a reference.

Although the subject invention is described in terms of measuring a pixel signal on the floating diffusion of an APS pixel in order to determine if the pixel is aberrant, it is contemplated that other photosensitive elements within the pixel may be used instead of the floating diffusion. For example, a separate dedicated photosensitive element may be formed, perhaps by partitioning the photodiode and providing a second transfer gate.

Figure 3:
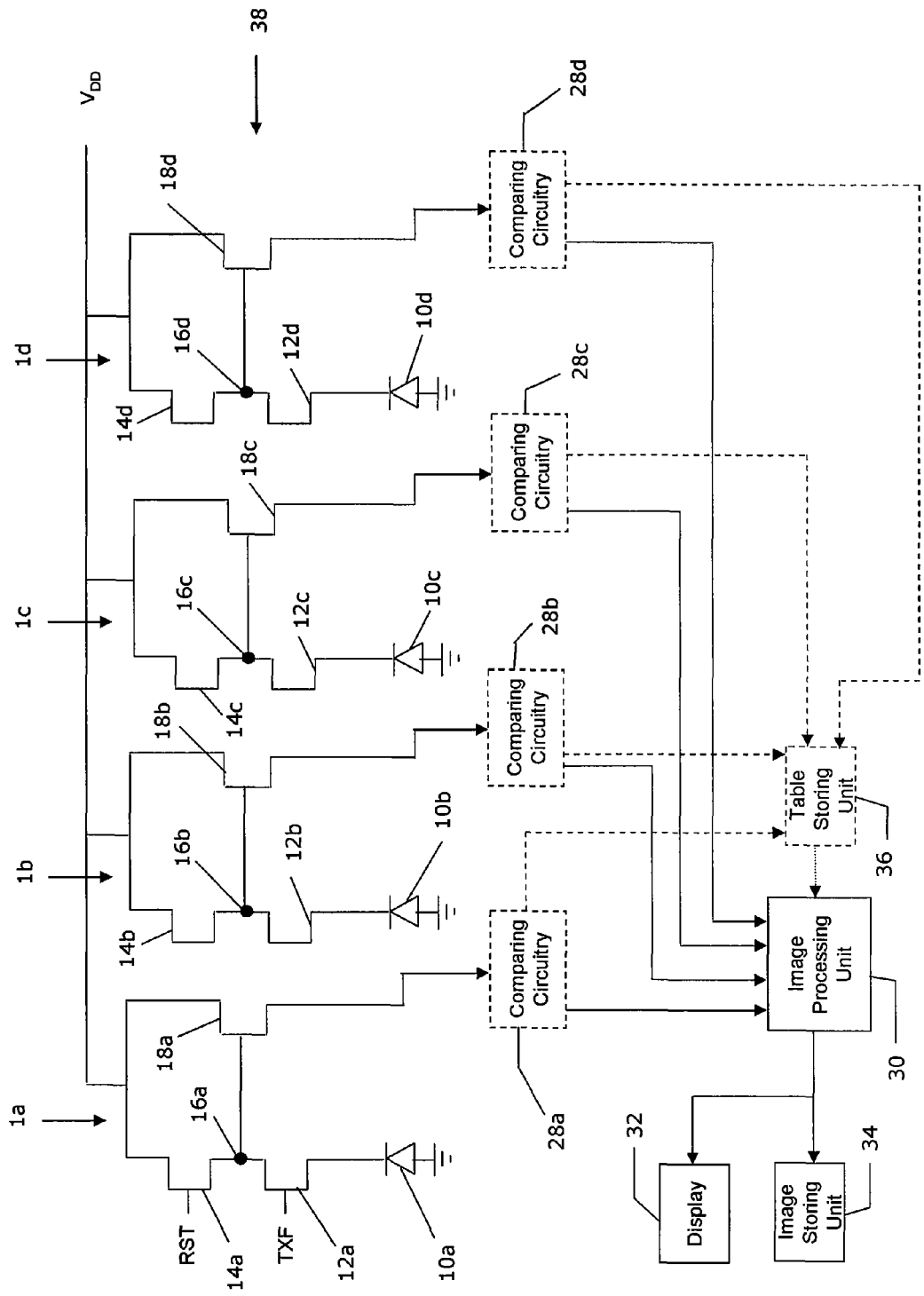
FIG. 3 is a diagram of an example portion of a system for identifying and correcting aberrant pixels according to an example embodiment of the present invention.
Figure 4:
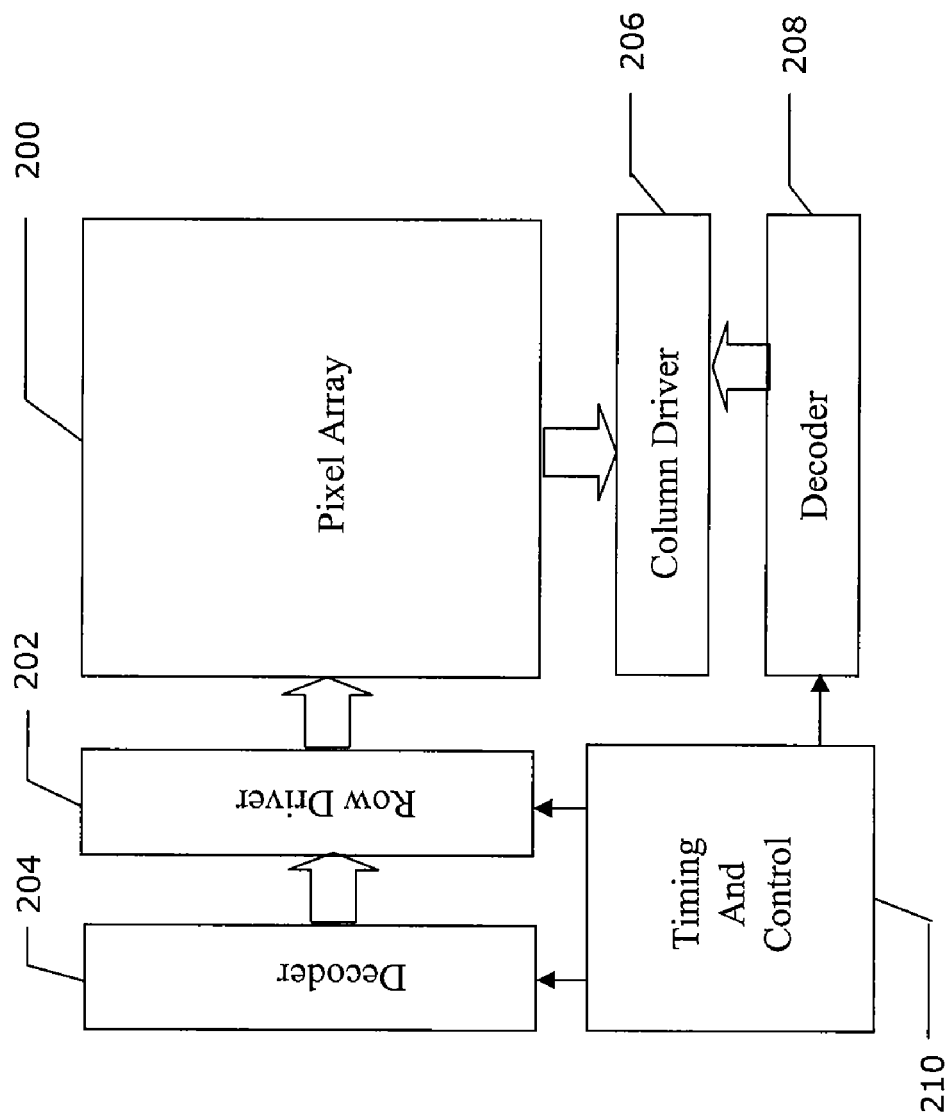
FIG. 4 is a diagram of another example portion of a system for identifying and correcting aberrant pixels according to an example embodiment of the present invention.
Figure 9:
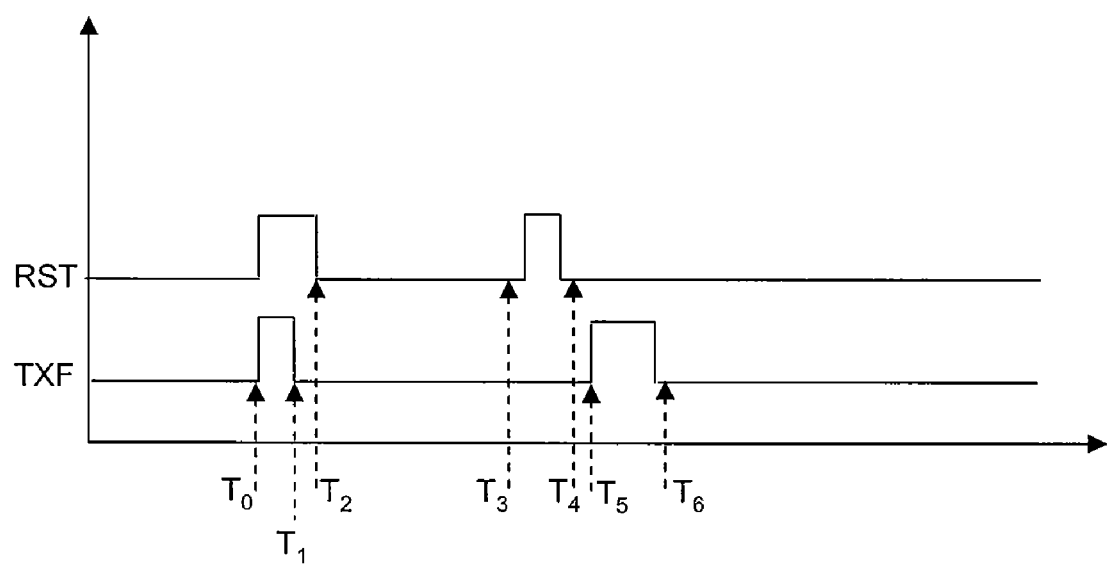
FIG. 9 is a timing diagram showing the timing of some of the example steps shown in FIG. 6.
Figure 10:
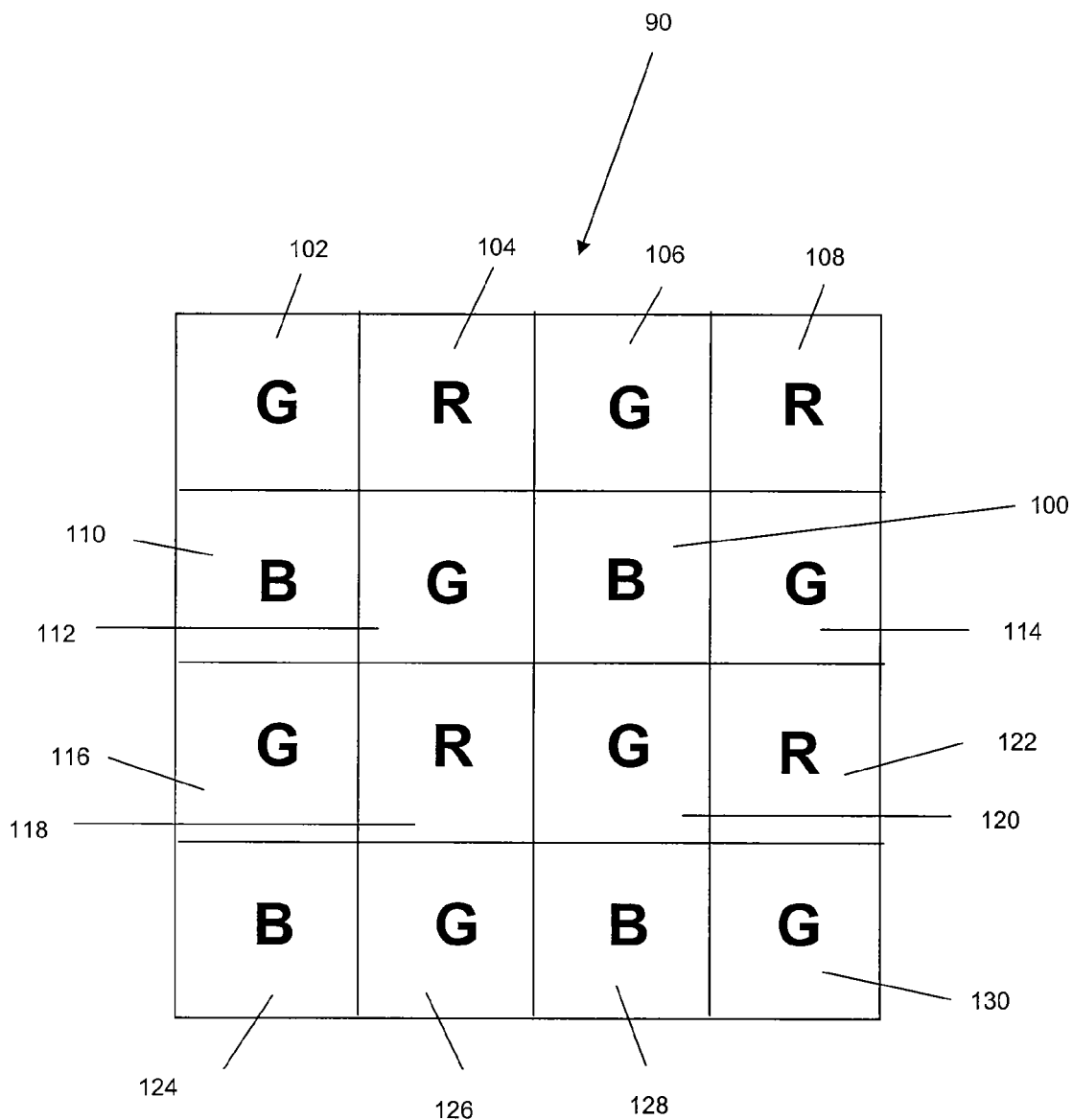
FIG. 10 is a diagram of an example pixel array for illustrating aberrant pixel correction techniques according to an embodiment of the present invention.

The steps for carrying out aberrant pixel detection using floating diffusion 16 are similar to those described above. An aberrant pixel algorithm and a system for implementing the aberrant pixel algorithm using the floating diffusion are described with reference to FIGS. 3-9. FIGS. 3 and 4 show portions of a system for implementing the aberrant pixel algorithm using the floating diffusion. To illustrate the connections between the pixels and the comparing circuitry, FIG. 3 includes a row 38 of four pixels 1*a-d*. An imager may, however, consist of an array of any number of pixels disposed in any number of rows and columns. FIGS. 5-8 show steps the algorithm may take to identify and correct aberrant pixels. FIG. 9 shows timing diagrams which are useful for describing some of the steps in the algorithm. FIG. 10 shows an example pixel layout within a pixel array for illustrating several example pixel correction algorithms. The system and algorithm are described with reference to one pixel 1*a*. However, as will become apparent, the algorithm may identify aberrant pixels in the entire array.

The example shown in FIG. 3 may include a row of four pixels 1*a-d*. Each one of pixels 1*a-d* may include a floating diffusion 16*a-d*, a photodiode 10*a-d*, a reset transistor 14*a-d* and a source follower transistor 18*a-d*. To simplify the description, the select transistors are omitted in FIG. 3. Photodiode 10*a* is described in the above example as a pinned photodiode. By design, a pinned photodiode may return to its pinning voltage after charge from the pinned photodiode is transferred to the floating diffusion. Photodiode 10*a* may, however, be any photosensitive element, as noted above.

Each one of pixels 1*a-d* optionally includes an associated comparing circuitry 28*a-d*. Optional table storing unit 36 may be provided for optionally storing the outputs from comparing circuitry 28*a-d* in an aberrant pixel table. Image processing unit 30 may receive the output signals from comparing circuitry 28*a-d*, or, optionally, information on the aberrant pixels stored in table storing unit 36, in order to correct for the aberrant pixels when processing the captured image. In an alternative embodiment, the aberrant pixel detection may be performed digitally in the image processing unit 30 and the comparing circuitry 28*a-d* and table storing unit 36 may be eliminated. The processed image may be an image signal output to display 32, image storing unit 34 or any other medium. The image processing unit may include, for example, a microcontroller, a microprocessor, a digital signal processor or an application specific integrated circuit (ASIC).

The example system portion shown in FIG. 4 may include pixel array 200. In one embodiment, pixel array 200 may include pixels 1*a-d* of FIG. 3. In other embodiments, pixel array 200 may include any number of rows and columns of any number of pixels. In operation, the pixels of each row in array 200 may all be turned on at the same time by a row select line (not shown). In an alternative embodiment, the pixels of each column may be selectively accessed by a column select line (not shown). A plurality of row and column lines may be provided for the entire array 200. The row lines may be selectively activated by row driver 202 in response to row address decoder 204. In this way, a row and address may be provided for each pixel. The CMOS imager may be operated by control and timing unit 210, which may control address decoders 204 and 208 for selecting the appropriate row lines for pixel readout and row and column driver circuitry 202 and 206, which apply driving voltage to the drive transistors of the selected row lines. Timing and control unit 210 may also control the timing of at least some steps in the pixel identification and correction algorithm, which is described in more detail below.

Figure 11:
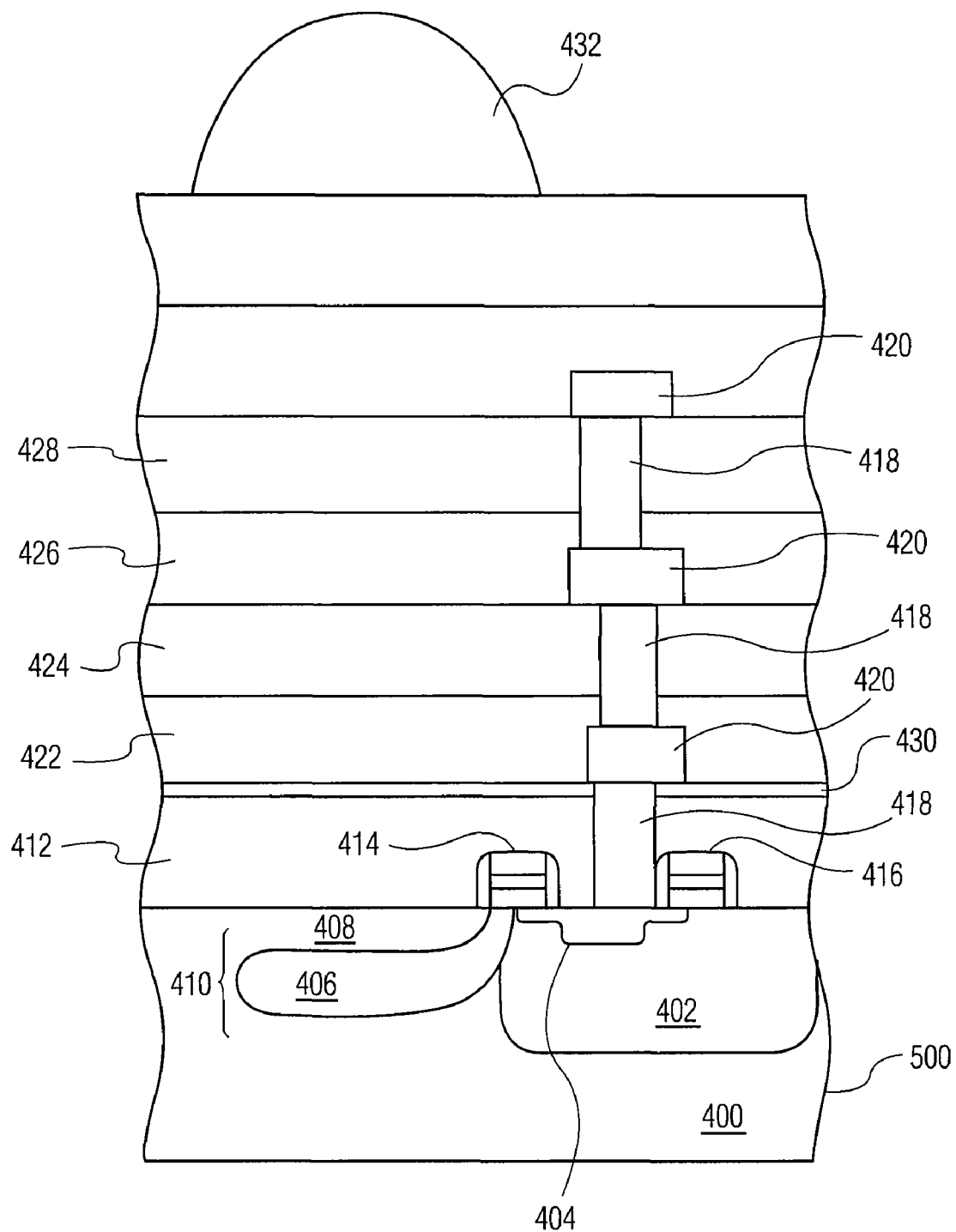
FIG. 11 is a diagram of an example pixel structure according to an embodiment of the present invention.

FIG. 11 shows a portion of an example pixel structure of example pixel 500. As shown, pixel 500 may include p-type substrate 400, p-type well 402 formed in p-type substrate 400, n-type floating diffusion region 404 formed in p-type well 402, p-type region 408 of p-type substrate 400, n-type region 406, insulating layer 412, transfer transistor with associated gate 414, reset transistor with associated gate 416, plugs 418, metal conductors 420, dielectric layer 430, passivation layers 422, 424, 426 and 428 and microlens 432. P-type region 408 may form a p-n junction with n-type region 406. In this way, p-type region 408 and n-type region 406 may form photodiode 410.

In the example embodiment shown in FIG. 11, vias 418 and metal conductors 420 are disposed over floating diffusion region 404 and not disposed above photodiode 410 so as to at least partially shade floating diffusion region 404 from the incident light and to leave a large portion of photodiode 410 directly exposed to the incident light. Microlens 432 may be included to assist in directing the incident light onto photodiode 410. This layout may be desirable to ensure that as much of the incident light as possible is directed toward photodiode 410 so that photodiode 410 may accurately detect the level of the incident light. Vias 418 and metal conductors 420 may provide an electrical connection between floating diffusion region 404 and subsequent circuitry (not shown). Vias 418 and metal conductors 420 may be disposed over floating diffusion region 404 so as to shade floating diffusion region 404. Despite shading, the floating diffusion will still collect some amount of photogenerated electrons, due to optical crosstalk (stray light) and electrical crosstalk (diffusion of electrons) from the main photodiode. Such a photogenerated signal on the floating diffusion will be proportional to that on the main photodiode, with the proportionality dependent on details of the pixel layout, such as the amount of floating diffusion shading, microlens focus, main photodiode to floating diffusion distance, and other factors, as explained below in more detail.

Figure 5:
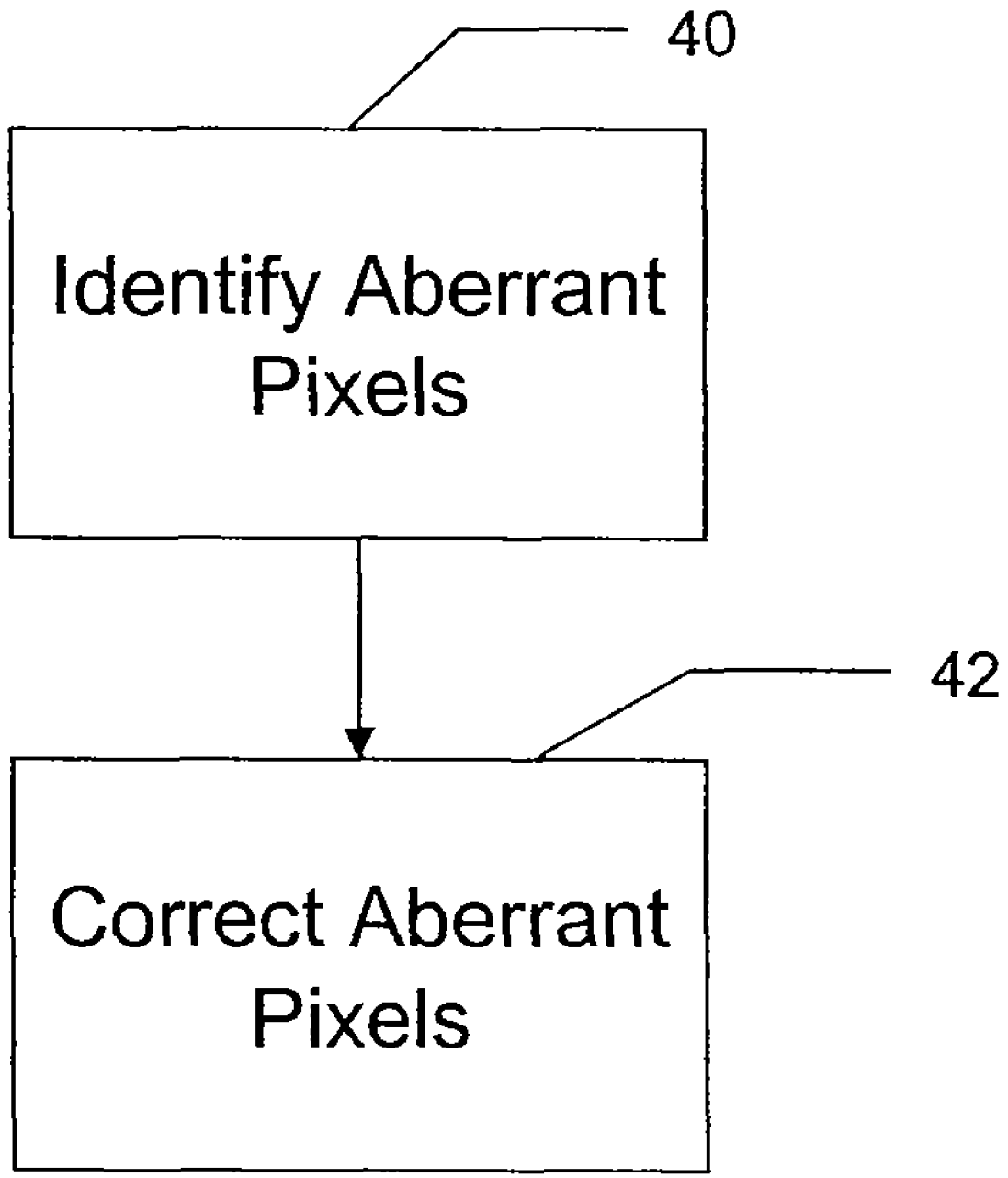
FIG. 5 is a flow chart showing example steps for identifying and correcting aberrant pixels according to an example embodiment of the present invention.

As shown in FIG. 5, the aberrant pixel algorithm includes identifying aberrant pixels at step 40 and correcting identified aberrant pixels at step 42. Step 40 is described below with reference to FIGS. 3 and 6. At steps 50 and 52 in FIG. 6, photodiode 10a may be reset by applying signal RST to reset transistor 14a and applying signal TXF to transfer gate 12a. This may turn on reset transistor 14a and transfer gate 12a and to draw electrons out of photodiode 10a, leaving photodiode 10a at its pinning voltage and floating diffusion 16a at its high (reset) level. At step 53, transfer gate 12a and rest transistor 14a may be turned off and the charge integration period for photodiode 10a and floating diffusion 16a may be initiated by exposing photodiode 10a and floating diffusion 16a to the incident light. At step 54, near the end of the exposure interval set for photodiode 10a, the level of floating diffusion 16a may be read through source follower 18a. The output level may be temporarily stored. Because, in this example embodiment, the floating diffusion, as a photodiode, operates in a manner similar to a 3T pixel, the pixel value read from the floating diffusion is referred to as a 3T image level.

At step 56, pseudo-CDS may be optionally initiated. If CDS is desired, floating diffusion 16a may be reset by applying signal RST and the signal on the floating diffusion may be read while the transfer gate is turned off. The reset floating diffusion may be read through the source follower 18a after the reset transistor 14a is turned off. This reset value may be stored and subtracted from the final output value for CDS.

At step 58, transfer signal TXF may be applied to transfer gate 12a to turn on transfer gate 12a. This may share charge collected on photodiode 10a during the exposure interval with floating diffusion 16a. Because the pinning voltage of the pinned photodiode is typically higher than the reset voltage of the floating diffusion, substantially all of the charge from the photodiode is transferred to the floating diffusion. Then, at step 60, the signal level of photodiode 10a may be sampled through source follower 18a and may be stored or processed as described below.

The timing at which the signals RST and TXF may be applied, for example, to pixel 1a may be carried out by timing and control unit 210 shown in FIG. 4. The procedure for sampling the pixel is shown in the flow-chart diagram of FIG. 6 according to the timing diagrams shown in FIG. 9.

Figure 6:
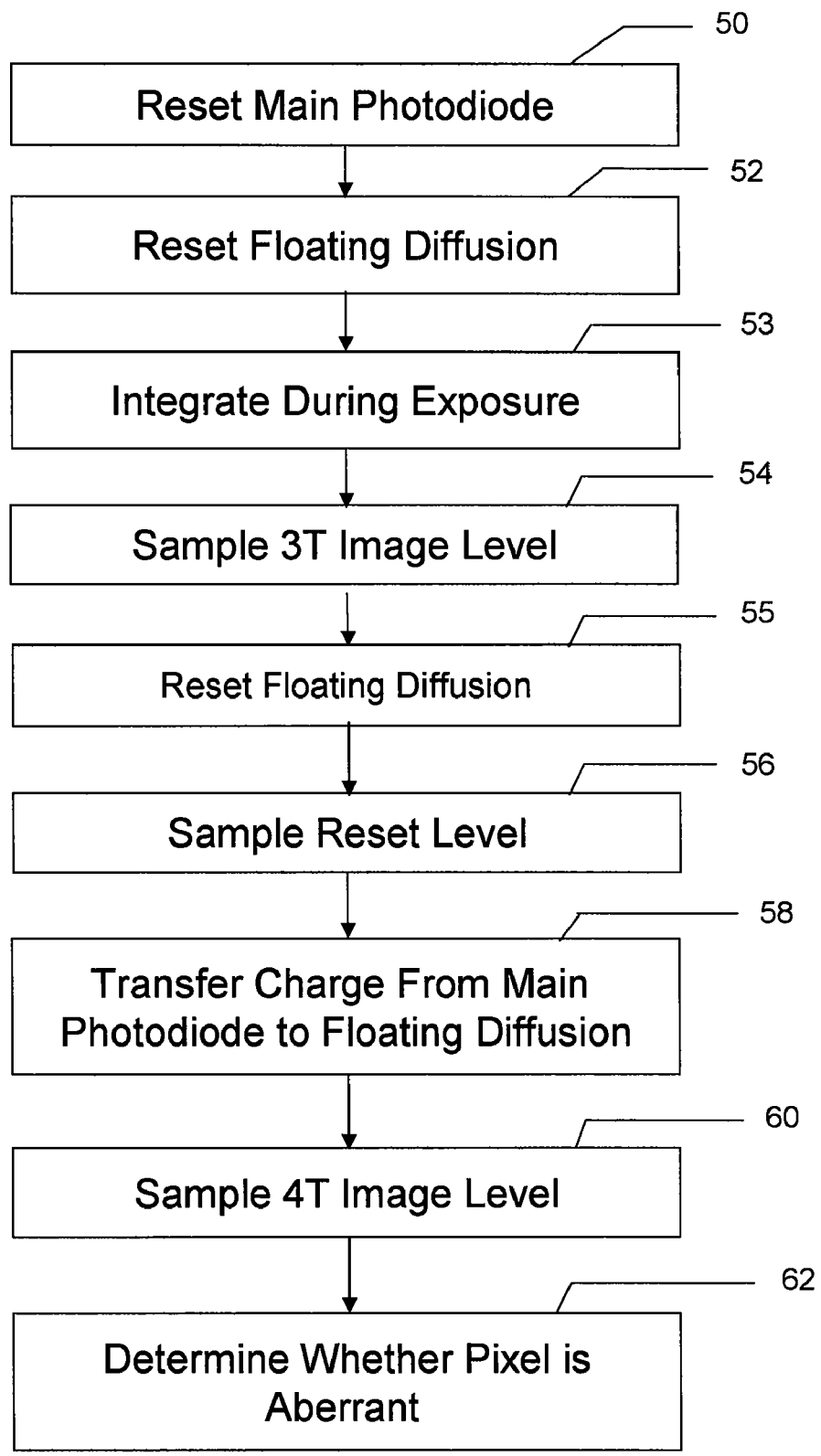
FIG. 6 is a flow chart showing example steps for identifying aberrant pixels according to the example embodiment of FIG. 5.

At step 50 of FIG. 6 and at time $T_0$ of FIG. 9, both the rest signal, RST, and the transfer gate signal, TXF, are asserted to reset both the photodiode 10a and the floating diffusion 16a. At time $T_1$, the signal TXF transitions to a low state, isolating the photodiode 10a from the floating diffusion 16a. Next, at time $T_2$, the rest signal RST transitions to a low state, turning off the rest transistor 14a. At step 52 of FIG. 6, the floating diffusion 16a is reset. In the time between $T_2$ and $T_3$, both the photodiode 10a and the floating diffusion 16a integrate photo-electrons. This is represented by step 53 of FIG. 6. At time $T_3$, the accumulated charge on the floating diffusion 16a may be read through the source-follower transistor 18a and stored on a capacitor (not shown). This corresponds to step 54 of FIG. 6 in which the 3T pixel sample is obtained. Immediately after time $T_3$, the reset signal, RST, is again asserted and the floating diffusion 16a is reset, as shown in step 55. At time $T_4$ and in step 56, after the signal RST transitions to a low state, the reset level of the floating diffusion is read and stored on a second capacitor (not shown). A this time, the stored reset level may be subtracted from the stored 3T sample to provide a 3T value representing the photo-charge stored on the floating diffusion minus the reset value. Next, at time $T_5$ and step 58, the signal TXF is asserted, transferring the accumulated charge on the photodiode 10a to the floating diffusion 16a, as described above. At time $T_6$ and step 60, after the signal TXF transitions to a low state, the photodiode value on the floating diffusion 16a is read and stored on a capacitor. This value is also known as the 4T sample, as it was obtained by using the transfer gate 12a. The capacitor on which the 4T sample is stored may be the same capacitor as was used to store the accumulated charge from the floating diffusion 16a (i.e. the 3T sample). After time $T_6$, the stored reset value on the second capacitor may be subtracted from the stored photodiode value to provide an image signal value, known as the 4T value. The image signal value and the 3T value are then compared in step 62 to determine whether the pixel is aberrant.

In FIG. 9, example signals RST and TXF are assigned specific voltages when a signal is applied to turn on or off the associated transistor, which are shown on the y-axis. The different voltages for RST and TXF may be any value suitable for use with the provided circuitry.

In FIG. 9, the integration time of the floating diffusion 16a is from $T_2$ to $T_3$ while the integration time of the photodiode 10a is from $T_1$ to $T_5$. Although not shown in the drawing of FIG. 9, these two integration intervals may be approximately the same. This is because both of the photosensitive elements 10a and 16a are desirably exposed to the incident light for some minimum period of time for the scene to be adequately captured. The minimum time for integration may differ from imager to imager. At least a small amount of time is reserved before the end of the integration period for floating diffusion 16a to be read. This read is completed before charge is transferred from photodiode 10a to floating diffusion 16a. Accordingly, the time over which floating diffusion 16a may be exposed to the incident light before it is read out may be less than the integration time of the photodiode 10a.

Figure 7:
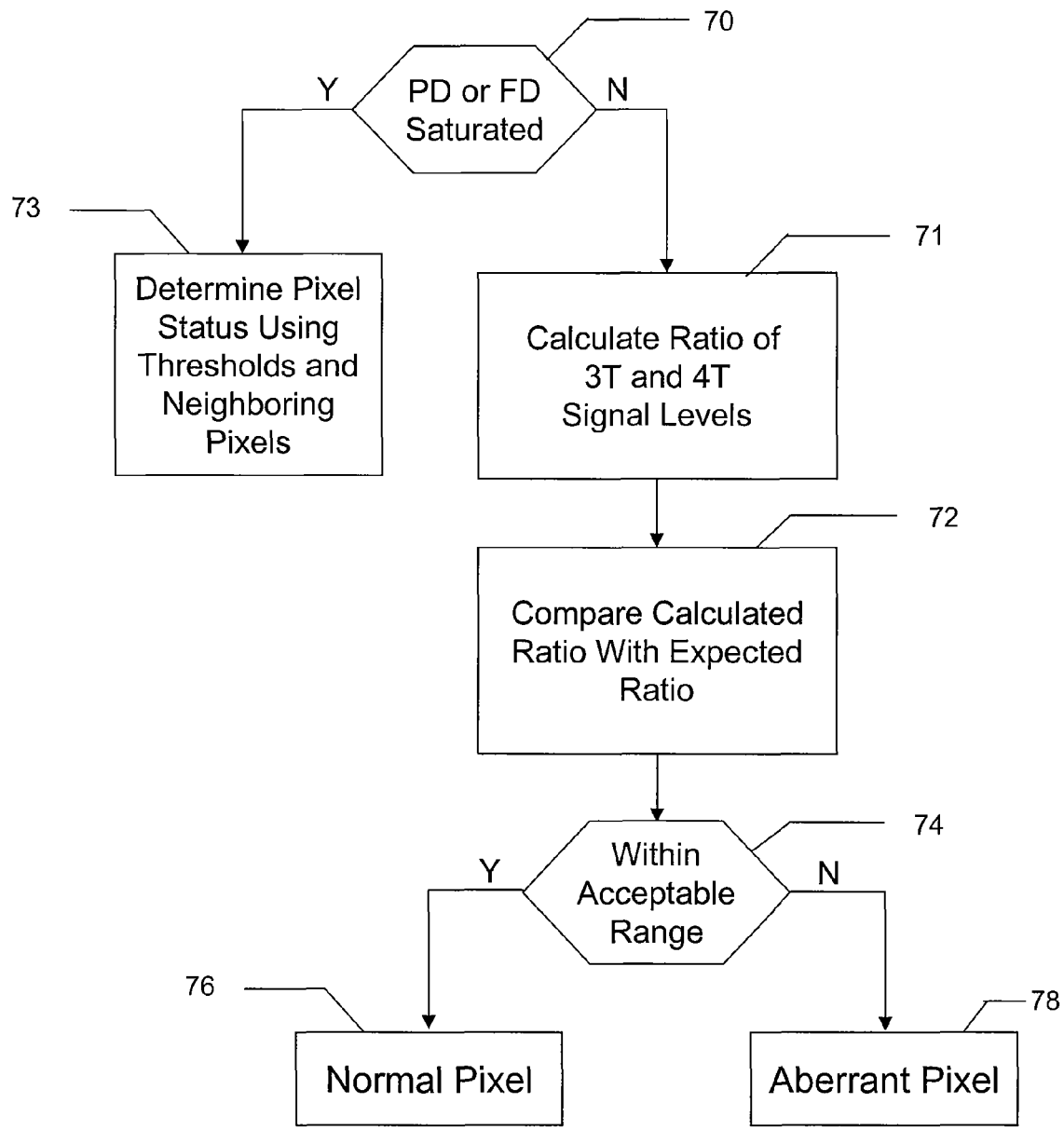
FIG. 7 is a flow chart showing additional example steps for identifying aberrant pixels according to the example embodiment of FIGS. 5 and 6.
Figure 8:
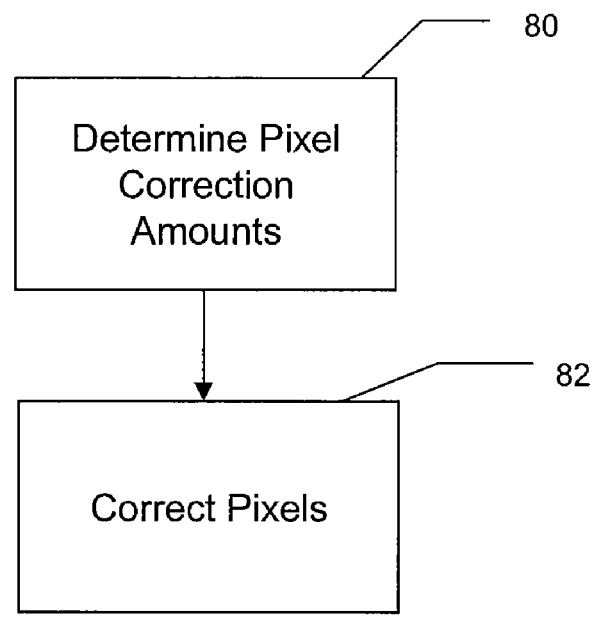
FIG. 8 is a flow chart showing steps for correcting aberrant pixels according to an example embodiment of the present invention.

FIG. 7 is a flow-chart diagram describing an example process by which aberrant pixels may be identified. At step 70, the process determines whether the photodiode 10a or the floating diffusion 16a is saturated. This may be done, for example, by comparing the respective 3T and 4T values with known maximum values. If either of the respective values is within a threshold value of the respective maximum value, the photodiode 10a or the floating diffusion 16a is assumed to be saturated. If the structure of the device is such that the floating diffusion 16a saturates before the photodiode 10a and either of the photosensitive elements is determined to be saturated in step 70, then the pixel is determined to be aberrant according to Table 1.

TABLE 1

| Floating Diffusion Saturated | Photodiode Saturated | Result |
|---|---|---|
| YES | NO | Compare 3T value with threshold; If below threshold, pixel is aberrant; |
| YES | YES | Compare 4T value with Neighbors; |
| NO | YES | Aberrant; |

The threshold value in the first row is the normal-pixel signal value expected on the photodiode 10a when the photodiode 16a saturates. The "compare with neighbors" in the second row indicates that the comparison of the 3T and 4T pixels is inconclusive. The saturation may be legitimate (due to high illumination) or it may indicate a defect affecting both the photodiode 10a and the floating diffusion 16a. The "compare with neighbors" step indicates a conventional check of the pixel value against values of surrounding pixels to determine if there are large differences. Such a result would indicate that the pixel is aberrant. The last row is the simplest, if the photodiode 10a is saturated and the floating diffusion 16a is not then the photodiode is defective.

If the structure of the device is such that the photodiode 10a saturates before the floating diffusion 16a, then the roles of the photodiode 10a and the floating diffusion 16a are reversed in Table 1.

If neither pixel value is determined to be saturated at step 70, step 71 is executed. With respect to example pixel 1a, at step 71, comparing circuitry 28a of FIG. 3 may compare the stored values read out from floating diffusion 16a and photodiode 10a. In one example embodiment, comparing circuitry 28a may first calculate a ratio of charge on floating diffusion 16a to charge on main photodiode 70a according to the following example equation: $Ratio_{actual} = V_{FD}/V_{PD}$. At step 72, the calculated actual ratio may be compared with an expected ratio according to the following equation: $Error = Ratio_{actual} - Ratio_{expected}$. The result of step 72 may be compared against a range of acceptable ratios in step 74. If the calculated ratio is within the range, the pixel is normal, at step 76. If it is not within the range, the pixel is determined to be aberrant at step 76. At this point, the algorithm may continue on to correct the pixel.

As described below, calculating a ratio is not necessary for operation of the example systems and algorithms. The ratio of charge on the floating diffusion compared to charge on the photodiode may be a known constant for a given pixel array layout, based on the relative area of the array, illumination and shadowing of the photodiode and the floating diffusion and collection efficiency or dopant profiles of the floating diffusion and photodiode junctions. Because the ratio may be a known constant, the known constant may be used as the expected ratio. Rather than calculate a ratio of the charge on the floating diffusion to the charge on the photodiode a measure of the charge on the floating diffusion may be scaled by the known constant ratio and compared to a measure of the range of values including the scaled measure of charge on the floating diffusion, the pixel may be determined to be aberrant. This test may be advantageous in a digital environment as it does not include a division step.

Pixel correction at step 42 of FIG. 5 may be performed by substituting the 4T value calculated from the 3T value. Alternatively, the 4T value may be determined from the surrounding pixels according to the example steps shown in FIGS. 8 and 10. As shown, the example steps include determining pixel correction amounts at step 80 and correcting pixels at step 82. Steps 80 and 82 are explained with reference to FIG. 10.

FIG. 10 shows an example pixel array 90. Example pixel array 90 includes a plurality of rows and columns of different colored pixels. Pixels designated as "R" are red pixels having red filters disposed over them, pixels designated as "G" are green pixels having green filters disposed over them and pixels designed as "B" are blue pixels having blue filters disposed over them.

In one embodiment, pixel correction amounts may be determined using pixels surrounding the identified aberrant pixel. In FIG. 10, pixel 100 may represent an identified aberrant pixel. Surrounding pixels may include many different arrangements, some of which follow. Surrounding pixels may include any or all of the pixels immediately surrounding pixel 100, including pixels 104, 106, 108, 114, 122, 120, 118 and 112. Surrounding pixels may include other pixels in the same row or column as the aberrant pixel, including pixels 110, 112 and 114 or pixels 106, 120 and 128. Surrounding pixels may include pixels in surrounding rows or surrounding columns, including all or some of the rows or columns in the example array.

In another embodiment, surrounding pixels to be used to determine pixel correction amounts may be selected by pixel color. By way of example, example identified aberrant pixel 100 of FIG. 10 may be a blue pixel as shown. In this embodiment, surrounding pixels may include, for example, the three closest blue pixels to identified aberrant pixel 100. In this example, the three closest blue pixels may be pixels 110, 124 and 128. Selecting surrounding pixels having the same color assignment as the identified aberrant pixel may be desirable for reasons described above. As illustrated in the example pixel array shown in FIG. 10, however, the blue pixels are not the closest pixels to example identified aberrant pixel 100. Accordingly, it may be desirable to select pixels having other colors due their closer proximity to the identified aberrant pixel.

One method for using the surrounding pixels to provide a substitute pixel value for an aberrant pixel may include averaging the levels of the surrounding pixels and using the average value as the value for the pixel. Another method may include using the median value of the surrounding pixels as the value for the pixel. Yet another method may include selecting a maximum level from the levels output by the surrounding pixels and using the selected level as the value for example identified aberrant pixel 100. If pixels with different color assignments are used to generate this value, it may be desirable to scale the various color pixel values according to their luminance contribution before averaging them.

As described above, instead of generating the 4T value from surrounding pixels, the read out 3T value from the floating diffusion 16a may be scaled by an appropriate factor and used as the value for the aberrant pixel. This method may be desirable where, for example, the floating diffusion is smaller than the photodiode and, as such, the charge on the floating diffusion is smaller than the charge on the photodiode.

In yet another example embodiment, pixels may be corrected using both a combination of surrounding pixels and the floating diffusion 3T pixel level from the aberrant pixel. If, for example, the floating diffusion has saturated, using the floating diffusion level to correct the aberrant pixel may result in light spot on the image. It may be desirable to use one or the other or both of surrounding pixel values and the 3T floating diffusion level to correct the aberrant pixel. Here, an aberrant pixel table may be useful to store indications of the best correction mechanism to be applied to the pixel. In this way, the processing unit may apply the best correction mechanism for each pixel.

Pixel correction at step 82 may be carried out according to any of the methods described above. In one example embodiment, a table storing unit 36, as shown in FIG. 3, may be used to map the aberrant pixels. Table storing unit 36 may mark non-identified pixels as normal pixels and identified pixels as aberrant pixels. The stored table may then be used by example image processor 30 to process the image and to correct only the identified aberrant pixels. In one example embodiment, when producing the image from the levels output from each pixel in the array, image processor 30 may use correction factors stored in the table to scale the level of each aberrant pixel.

In another example embodiment, table storing unit 36 may not be used. Instead, as shown in FIG. 3, the correction values may be provided directly to example image processor 30. In this embodiment, aberrant pixel correction may be configured to take place, for example, every time an image is captured.

Due to common usages of the floating diffusion region, imagers are typically constructed by design such that the floating diffusion region is disposed under metal interconnect layers. One such construction is described above with reference to FIG. 11. In these imagers, the floating diffusion region may be shaded from the incident light to prevent as much incident light as possible from accumulating in the floating diffusion region. This common construction may nevertheless be usable with the present invention if the floating diffusion region is exposed to at least some amount of the incident light. If such construction is used, the integration rate of the floating diffusion may be significantly less than the integration rate of the photodiode. Accordingly, if embodiments of the present invention are incorporated into a layout where the floating diffusion region is shaded, the 3T level provided by the floating diffusion may be used to correct for an erroneous 4T level provided by the photodiode using the ratio as described above.

Figure 12:
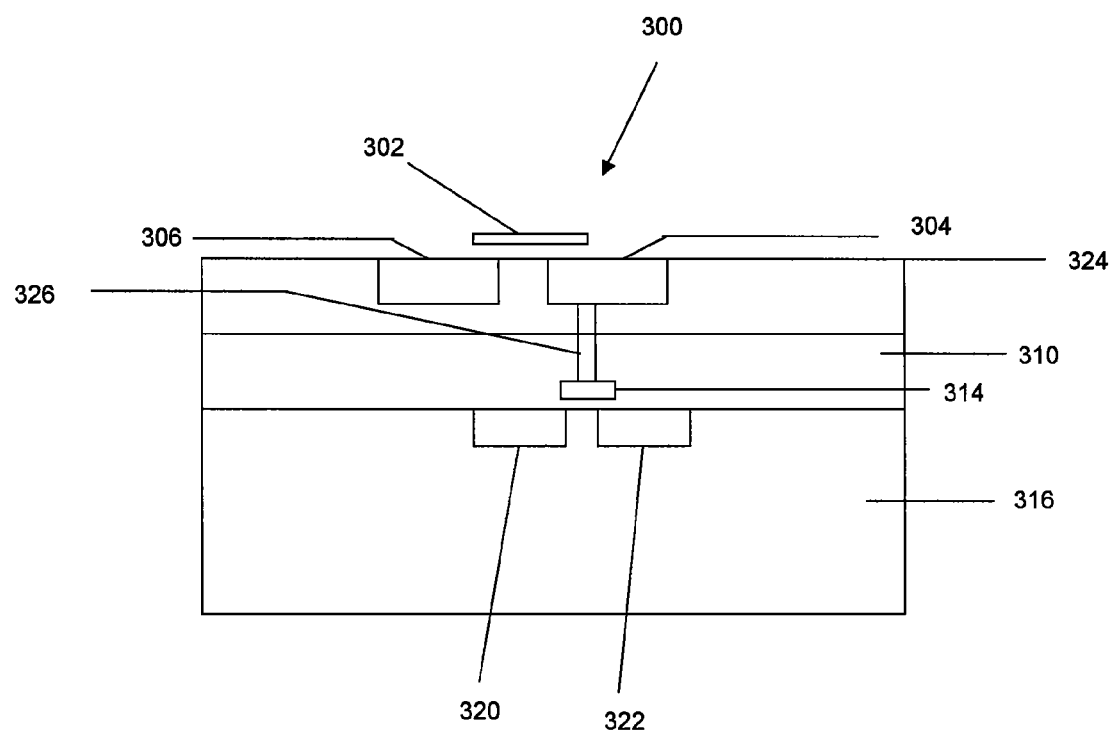
FIG. 12 is a diagram of another example pixel structure according to an embodiment of the present invention.

Shading of the floating diffusion may be desirable or undesirable, depending on the overall design goals for the imager. It may, for example, be desirable for the floating diffusion to be unshaded so that it may capture as strong an image of the incident light as possible. It may also be desirable for the floating diffusion to be unshaded so that it may receive a maximum amount of color filtered light. On the other hand, if the floating diffusion is smaller than the photodiode, it may be desirable to shade the floating diffusion in order to prevent saturation of the floating diffusion during integration. Also, if, for example, the floating diffusion is used relatively infrequently for aberrant pixel detection, such as where a table storing unit is used, it may be desirable to shade the floating diffusion to minimize residual charge when the floating diffusion is reset.

Where it is desirable for the floating diffusion to be unshaded, a structure such as the example structure shown in FIG. 12 may be used to expose the floating diffusion region to direct incident light. As shown in FIG. 12, the example structure of example pixel 300 may include p-type substrate 316, n-type polysilicon regions 318, 320 and 322 formed in p-type layer 316, dielectric region 310, gates 312 and 314 formed in dielectric region 310, p-type region 324. P-type regions 304 may form the photodiode of the pixel and n-type region 306 may form the floating diffusion. Gate 302 may be the transfer gate between the photodiode and the floating diffusion. Charge accumulated on the floating diffusion may control the gate 314 of a source follower transistor formed by regions 322 and 320. Gate 312 may control a row-select transistor formed by regions 318 and 320. A reset transistor (not shown) may be included in either region 316 or 324, depending on design constraints, and be connected to floating diffusion region 304.

In the example structure of FIG. 12, photodiode 306 and floating diffusion region 304 are disposed in an uppermost layer of example pixel 300 so as to be in a direct path of incident light (not shown). Thus, the example structure may be used if direct exposure of the floating diffusion to incident light is desirable.

The present invention is a method and apparatus for identifying aberrant pixels in an image sensor. A light sensitive element is configured to detect a first signal value representing a first level of an incident light and a light sensitive region separate from the light sensitive element is configured to detect a second signal value representing a second level of the incident light. Comparing circuitry is configured to compare the first and second signal values and to output a signal indicating the pixel is an aberrant pixel if the first and second signal values differ by more than a maximum threshold value or by less than a minimum threshold value in a threshold value range.

While the invention has been described in terms of exemplary embodiments, it is contemplated that it may be practiced with variations within the scope of the following claims.

What is claimed:

1. A method of operating a pixel, the method comprising the steps of:
   exposing a light sensitive element of the pixel and a light sensitive region of the pixel to incident light;
   sampling a first signal value from the light sensitive region, the first signal value corresponding to a level of the incident light detected by the light sensitive region during exposure;
   sampling a second signal value from the light sensitive element, the second signal value corresponding to a further level of the incident light detected by the light sensitive element during exposure;
   comparing the first and second signal values to respective threshold values to determine if either the photosensitive element or the photosensitive region is saturated; and
   comparing the first and second signal values to determine if the pixel is aberrant.

2. The method of operating a pixel of claim 1, wherein:
   the step of comparing the first and second signal values determines that neither the photosensitive element nor the photosensitive region is saturated; and
   the step of comparing the first and second signal values to determine if the pixel is aberrant includes the steps of:
   generating a ratio of the first and second signal values;

comparing the generated ratio with a predetermined range of ratio values; and identifying the pixel as an aberrant pixel if the generated ratio is not within the predetermined range.

3. The method of claim 1, wherein the step of comparing the first and second signal values determines that the photosensitive region is saturated and the photosensitive element is not saturated and the step of comparing the first and second signal values to determine if the pixel is aberrant includes the steps of:

comparing the second signal value with a threshold indicating an expected value of the second signal value when the photosensitive region is saturated; and if the second signal value is less than the threshold value, identifying the pixel as an aberrant pixel.

4. The method of claim 1, wherein the step of comparing the first and second signal values determines that both the photosensitive region and the photosensitive element are saturated and the step of comparing the first and second signal values to determine if the pixel is aberrant includes the step of comparing the second signal value to corresponding second signal values from neighboring pixels and, if the second signal value differs by more than a threshold value from the corresponding second signal values from the neighboring pixels, identifying the pixel as aberrant.

5. The method of operating a pixel of claim 1, wherein the step of sampling the first signal value from the light sensitive region is executed during an integration interval in which the light sensitive element and the light sensitive region are exposed to the incident light, and wherein the step of sampling the second signal value from the light sensitive element is executed after the integration interval.

6. The method of operating a pixel of claim 1, further comprising:

resetting the photosensitive element and the photosensitive region before exposing the photosensitive element and the photosensitive region to the incident light; and after sampling the first signal value, resetting the photosensitive region and sampling a reset signal from the photosensitive element.

7. An imager comprising:

a plurality of pixels arranged in a plurality of rows and columns, wherein each of the plurality of pixels comprises:

a light sensitive element configured to detect a first signal value representing a first level of an incident light; and a light sensitive region configured to detect a second signal value representing a second level of an incident light;

comparing circuitry configured to receive and compare the first and second signal values and to provide an output signal indicating if the pixel is an aberrant pixel; and an image processing unit configured to receive the output signal from the comparing circuitry of each of the plurality of pixels and to correct the first signal value from each pixel indicated as aberrant.

8. The imager of claim 7, wherein the image processing unit is configured to correct the first signal value from each pixel indicated as aberrant by scaling the second signal value and replacing the first signal value with the scaled second signal value.

9. The imager of claim 7, wherein the image processing unit is configured to determine a best pixel correction method from among a plurality of pixel correction methods, and wherein the image processing unit is further configured to correct the first signal value from each pixel indicated as aberrant using the determined best pixel correction method.

10. A method for determining if a pixel in an electronic imager is aberrant comprising:

measuring a signal value provided by the pixel in the electronic imager as a first pixel value;

measuring a signal value provided by a photosensitive element in proximity to the pixel as a second pixel value;

determining if the first pixel value or the second pixel value is saturated;

if the second pixel value is saturated and the first pixel value is not saturated, comparing the first pixel value with a threshold value representing an expected value of the first pixel value and indicating that the pixel is aberrant if the first pixel value is less than the threshold value;

if both the first and second pixel values are saturated, comparing the first pixel value with pixel values from neighboring pixels and indicating that the pixel is aberrant if a difference between the first pixel value and the neighboring pixel values is greater than a further threshold value;

if the first pixel value is saturated and the second pixel value is not saturated, identifying the pixel as aberrant.

11. A method according to claim 10, further comprising:

if neither the first pixel value nor the second pixel value is saturated, calculating a ratio of the first pixel value and the second pixel value;

comparing the calculated ratio to a range of ratio values;

if the calculated ratio is not within the range of ratio values, identifying the pixel as aberrant.

12. A method according to claim 10, further comprising:

if neither the first pixel value nor the second pixel value is saturated, scaling the second pixel value by a predetermined scale factor;

calculating a difference between the first pixel value and the scaled second pixel value; and comparing the difference to a range of difference values;

if the difference is not within the range of difference values, identifying the pixel as aberrant.

13. A method according to claim 11, further comprising:

digitizing the first pixel value and the second pixel value, wherein the step of determining if the first pixel value or the second pixel value is saturated and the steps of determining if the pixel is aberrant are performed by one of a microprocessor or a digital signal processor.

14. A method according to claim 10, wherein the pixel is an APS pixel and the step of measuring a signal value provided by the pixel includes:

resetting a photodiode and a floating diffusion of the pixel;

integrating photo-charges on the photodiode and the floating diffusion;

generating the second pixel value from the accumulated photo-charges on the floating diffusion;

resetting a floating diffusion of the pixel without resetting the photodiode;

transferring the integrated photo-charges from the photodiode to the floating diffusion;

generating the first pixel value from the photo-charges on the floating diffusion.

15. A method according to claim 14, further comprising:

storing a value representing the reset floating diffusion after resetting the floating diffusion without resetting the photodiode and before transferring the integrated photo-charges from the photodiode to the floating diffusion;

subtracting the stored reset value from the a signal representing the accumulated photo-charges on the floating diffusion to generate the second pixel value; and subtracting the stored reset value from a signal representing the photo-charges on the floating diffusion that have been transferred from the photodiode to generate the first pixel value.

16. A method according to claim 10, wherein the step of identifying the pixel as aberrant includes the step of storing an address of the aberrant pixel in a table.

17. A method according to claim 16, further including the step of repeating the method for each pixel in the electronic imager.

* * * * *